Figure 1:
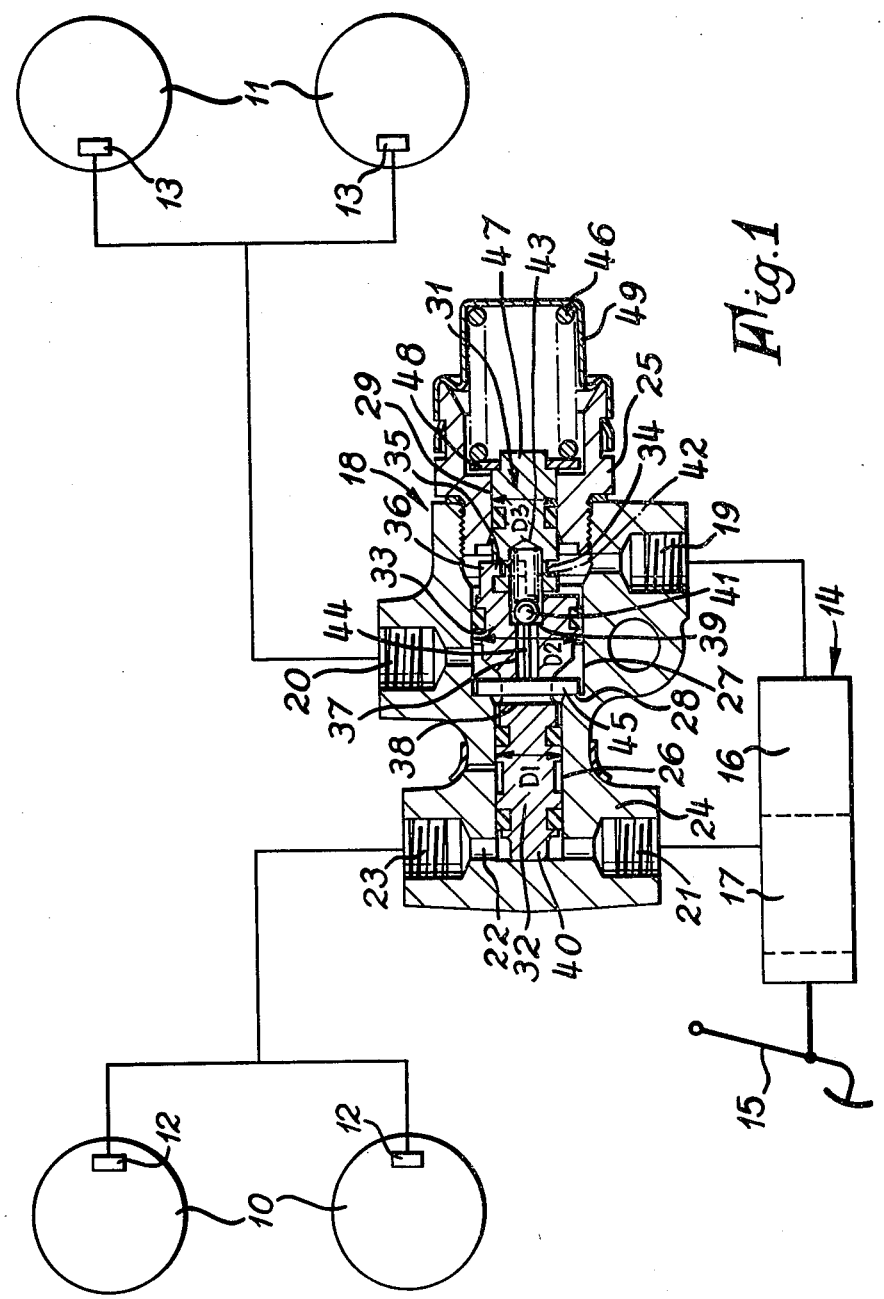

United States Patent [19]

Hales

[11] 4,072,361
[45] Feb. 7, 1978

[54] VALVE DEVICES FOR USE IN LIQUID PRESSURE BRAKING SYSTEMS OF VEHICLES

[75] Inventor: Eric Charles Hales, Leamington Spa, England

[73] Assignee: Automotive Products Limited, Warwickshire, England

[21] Appl. No.: 630,288

[22] Filed: Nov. 10, 1975

[30] Foreign Application Priority Data

Nov. 11, 1974 United Kingdom ............... 48739/74

[51] Int. Cl.² ........................... B60T 8/18; B60T 8/26
[52] U.S. Cl. .................................... 303/6 C; 188/195; 188/349; 303/22 R
[58] Field of Search ................... 303/6 C, 6 R, 84, 22; 188/349, 195

[56] References Cited

U.S. PATENT DOCUMENTS

| 3,149,886 | 9/1964 | Dorner | 303/6 C X |
|---|---|---|---|
| 3,467,440 | 9/1969 | Strien | 303/6 C |
| 3,545,814 | 12/1970 | Margetts | 303/6 C |
| 3,736,031 | 5/1973 | Yabuta et al. | 303/6 C |
| 3,804,468 | 4/1974 | Ishikawa et al. | 303/6 C |
| 3,848,932 | 11/1974 | Lewis | 303/84 A X |

Primary Examiner—Trygve M. Blix
Assistant Examiner—Douglas C. Butler
Attorney, Agent, or Firm—Kemon & Estabrook

[57] ABSTRACT

A valve device for use in split liquid pressure vehicle braking systems to control rear brake pressure comprises a plunger assembly in a cavity in a housing, the cavity being closed at one end. The plunger assembly has a central land between two smaller end lands. The central land slides within a central portion of the cavity which is between two smaller portions of that cavity. The central portion and the closed end portion of the cavity are formed in a main valve body and the other cavity portion is formed in another body which is carried by the main valve body. The plunger assembly carries a bar which co-operates with the shoulder between the central portion and the closed end portion of the cavity and with a valve unseating pin to unseat a ball in a passage through the central land. A biasing spring urges the plunger assembly towards the closed end of the cavity against the action upon the plunger assembly of front brake pressure which acts between the plunger assembly and the closed end of the cavity. Liquid pressure is transmitted from the master cylinder to the rear brake operating motor cylinders through those parts of the central cavity portion on either side of the central land when the ball is unseated and not when the ball is seated.

4 Claims, 3 Drawing Figures

VALVE DEVICES FOR USE IN LIQUID PRESSURE BRAKING SYSTEMS OF VEHICLES

This invention relates to valve devices for use in liquid pressure braking systems of vehicles to so control the pressure exerted to apply brakes on a group of wheels of the vehicle, usually the rear wheels, that that pressure, under a predetermined condition, is reduced in relation to the pressure at the source from which that pressure is derived, the predetermined condition being the pressure in the braking system at which the valve device becomes operative.

Liquid pressure vehicle braking systems are known in which brakes on two groups of wheels, said groups usually comprising the front wheels and the rear wheels respectively, are operated by liquid pressure from separate sources, under a common control, so that the braking system consists of two sub-systems the failure of either one of which does not render the other inoperative.

In liquid pressure braking systems as described in the last preceding paragraph and having included, in one sub-system, a valve device for the purpose hereinbefore set forth, it has been proposed to so construct and arrange the valve device that, in the event of failure of the other sub-system, the degree of pressure reduction that takes place in the said one sub-system is less than that which occurs when both sub-systems are working normally. The said valve device as previously proposed has included a stepped plunger which is mounted in a bore and which is so arranged that, when the valve device is mounted in a liquid pressure vehicle braking system, liquid pressure in the sub-system in which it is mounted exerts a force on said stepped plunger which is opposed by biassing means, which act on said plunger, and which tends to move the said plunger to permit closure by a valve member of a passage which by-passes the said plunger and through which liquid flows to the motor cylinders of that sub-system, and has also been so arranged that liquid pressure in the other sub-system acts to oppose the biassing means with the result that the effect of said biassing means on the stepped plunger is greater when said other sub-system is inoperative.

A valve device having the features hereinbefore set forth is hereinafter called a valve device of the kind referred to and it is the object of the present invention to provide an improved valve device of the kind referred to.

Briefly, in accordance with this invention in a liquid pressure braking system which includes two sub-systems which are operable under a common control to apply brakes to two groups of wheels so that the failure of either of the sub-systems does not render the other inoperative, there is provided a valve device which is included in one of the two sub-systems and which is arranged so that, under a predetermined condition, the pressure that acts to apply brakes to the respective group of wheels is reduced in relation to the pressure at the respective source of liquid pressure, the predetermined condition being the pressure in the respective sub-system at which the valve device becomes operative. The valve device comprises a housing in which a stepped cavity is formed, the cavity being closed at one end and open at the other end and having a central portion of uniform cross-section between two end portions, each end portion of the cavity having a uniform cross-section and being smaller in cross-sectional area than is the central portion of the cavity. The valve device includes a plunger assembly which is located within the cavity and which has three lands, a central one of the three lands being fitted slidably within the central cavity portion and each of the other two lands being fitted slidably within a respective one of the two end cavity portions. A first port of the valve device which opens into the closed end portion of the cavity is connected to the other sub-system. Second and third ports of the valve device which open in the central cavity portion one on each side of the central plunger land that fits in that central cavity portion, are connected respectively to the respective pressure source and motor cylinders of the respective sub-system, the second port being that which opens into the central cavity portion on the side of the piston land in that cavity portion which is further from the closed end of the cavity. A by-pass passage is formed in said plunger assembly and connects the part of the central cavity portion that is on one side of the central plunger land to the part of the central cavity portion that is on the opposite side of the central plunger land. A one-way valve in said bypass passage permits the transfer of liquid pressure from the second port to the third port only when it is open, and abutment means which co-operate with a stop surface in said cavity are provided to hold said one-way valve open for certain positions of the plunger assembly within the cavity. Also biassing means are provided, the biassing means being operable to exert a biassing load upon the plunger assembly which urges the plunger assembly towards the closed end of the cavity that is formed within the valve body and the abutment means being so arranged that the one-way valve is opened as the plunger assembly approaches the end of the cavity.

Preferably the closed end portion and the central portion of the cavity are respective portions of a stepped bore which is formed in one body of the housing, the other end portion of the cavity being formed in another body which is supported by said one body and which together with said body comprises the housing. The other body may be screwed into the open end of said one body.

The plunger assembly may comprise two plunger components which are coupled together, the central land and one of the other two lands being formed on one of the plunger components and the other land being formed on the other plunger component. More particularly I prefer that the two lands that are formed on said one plunger component comprise the central land and the land that slides within the closed end portion of the cavity, and the land that is formed on said other plunger component comprises the land that slides within the other end cavity portion. The two plunger components can be coupled together for longitudinal movement but free for limited movement one relative to the other transverse to the cavity to compensate for possible misalignment of the two cavity portions in the two bodies of the housing, and in such an arrangement the first of the two plunger components may be formed with a semi-circular wall which projects axially from it and upon which is formed an internal rib which fits into a circumferential groove which is formed in the second plunger component. In another arrangement the two plunger components may be interconnected by a transverse pin.

The by-pass passage may be stepped to provide a shoulder intermediate its ends, the shoulder serving as a seat for the one-way valve closure member, there being a spring which acts to seat the one-way valve closure member and which reacts against an abutment surface formed on part of the plunger assembly, said abutment means that co-operate with a stop surface in said cavity to hold said one-way valve open comprising a valve unseating pin within the smaller diameter portion of the passage and said stop surface comprising a shoulder in the cavity. The valve unseating pin may be engaged slidably within the smaller diameter portion of the stepped by-pass passage, or may be carried by the one-way valve closure member.

Preferably the by-pass passage extends axially within said plunger assembly. Where the by-pass passage is stepped to provide a shoulder intermediate its ends, the shoulder serving as a seat for the one-way valve closure member, there being a spring which acts to seat the one-way valve closure member and which reacts against an abutment surface formed on part of the plunger assembly, said abutment means that co-operate with a stop surface in said cavity to hold said one-way valve open comprising a valve unseating pin within the smaller diameter portion of the passage and said stop surface comprising a shoulder in the cavity, the abutment means may include a bar which projects laterally from one of the plunger components and which co-operates with both the valve unseating pin and the shoulder that is formed between the closed end cavity portion and the central cavity portion. Preferably the bar extends through a diametral passage through the plunger assembly and projects from both sides of the plunger assembly. Where the two lands that are formed on said one plunger component comprise the central land and the land that slides within the closed end portion of the cavity and the land that is formed on said other plunger component comprises the land that slides within the other end cavity portion, the abutment surface may be formed on said other plunger component.

Figure 2:
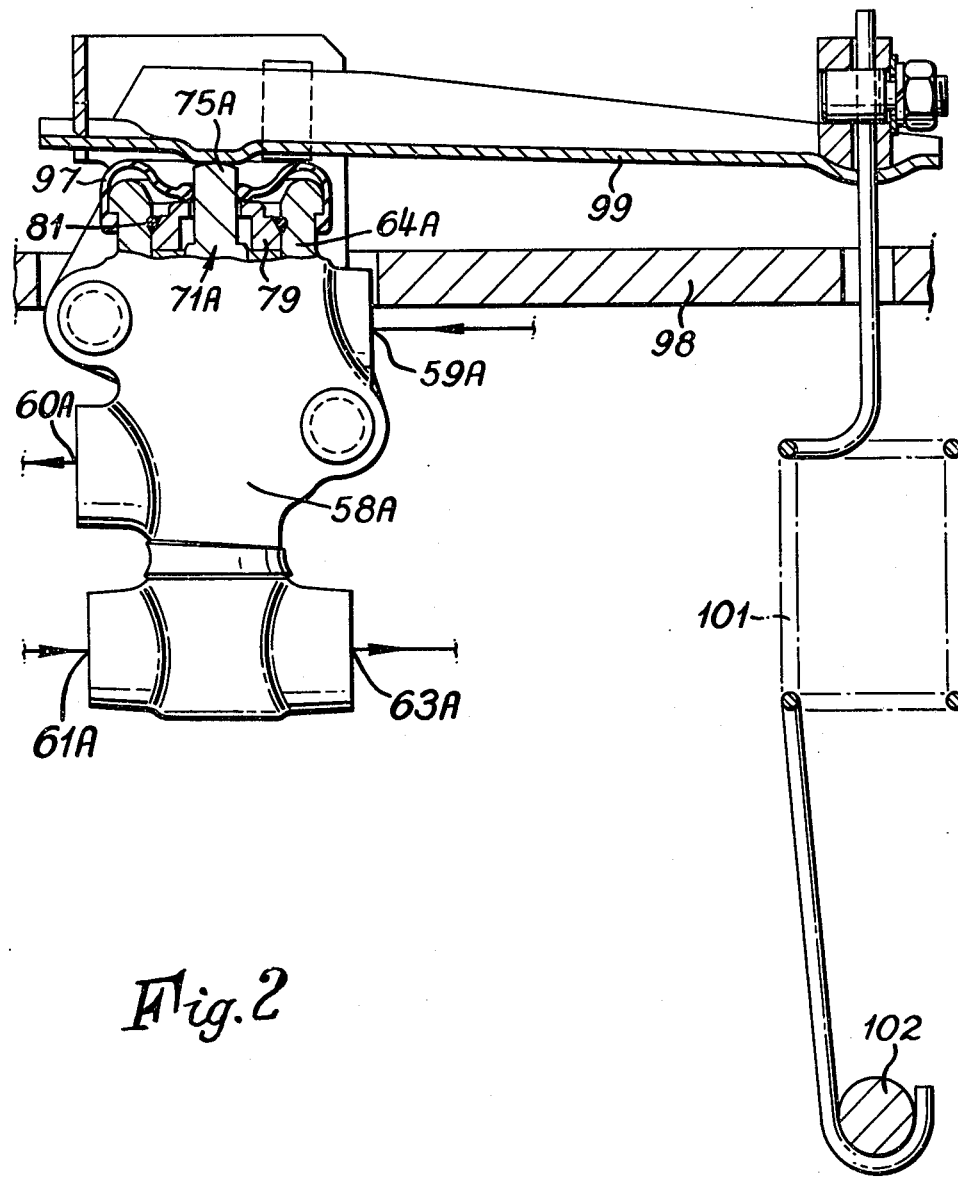
Figure 3:
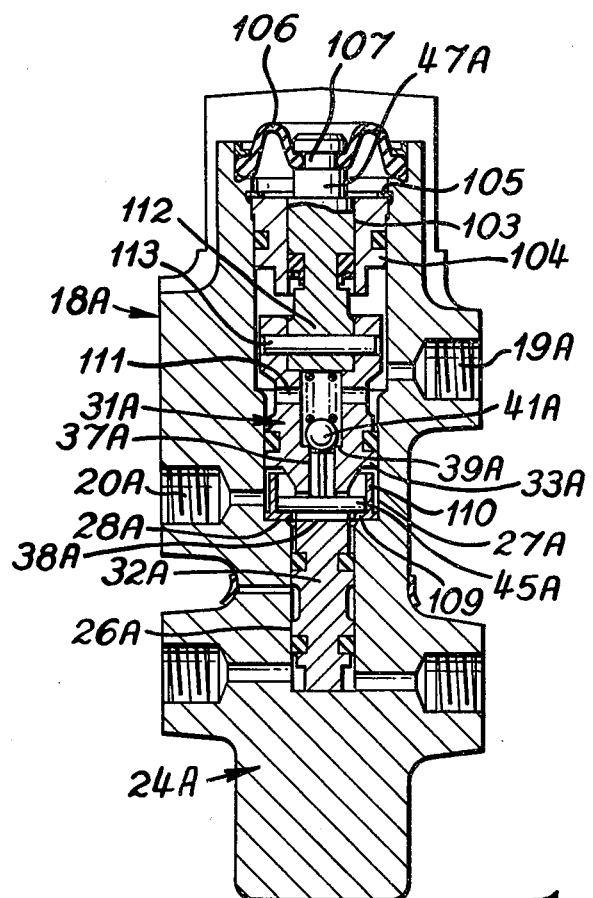

This invention will be described now by way of example with reference to the accompanying drawings, of which:

FIG. 1 is a diagrammatic illustration of a liquid pressure braking system of the split type for a vehicle, the braking system including a valve device for controlling liquid pressure which acts to apply brakes to the rear wheels of the vehicle, the valve device being shown sectioned in a transverse plane which includes its longitudinal axis;

FIG. 2 illustrates an assembly of a modified form of the valve device shown in FIG. 2 with a spring system which is arranged to exert a biassing load upon the plunger assembly of the valve device which varies with loading of the vehicle, the major part of the valve device being shown in elevation and only that part of the valve device that differs from the valve device shown in FIG. 1 being shown in section; and FIG. 3 is a transverse section through another modified form of the valve device shown in FIG. 1.

Referring to FIG. 1 of the drawings, the front wheels and rear wheels of a vehicle are represented by the circles 10 and 11 respectively, liquid pressure motor cylinders operating brakes on the front wheels being shown at 12 and corresponding motor cylinders operating brakes on the rear wheels being shown at 13. A tandem master cylinder 14 is operated by a pedal 15 and includes chambers 16 and 17 in which liquid pressure is generated. The chambers 16 and 17 are connected respectively to the motor cylinders 13 and 12 and, being isolated from one another, comprise separate sources of liquid pressure. The master cylinder chamber 16 and motor cylinders 13 thus constitute a rear brake operating sub-system of the liquid pressure braking syste, whilst the master cylinder chamber 17 and motor cylinders 12 constitute a front brake operating sub-system of the liquid pressure braking system.

A valve device 18, which embodies this invention, is incorporated in the rear brake operating sub-system. A conduit leads from the chamber 16 of the master cylinder 14 to an inlet 19 of the valve device 18 and the valve device 18 controls the communication between the inlet 19 and an outlet 20 from which a conduit leads to the rear brake motor cylinders 13. The front brake operating sub-system includes a conduit which leads from the other chamber 17 of the master cylinder 14 to a second inlet 21 of the valve device 18. A constantly open passage 22 in the valve device 18 places the second inlet 21 in communication with a second outlet 23 which is connected to the front brake motor cylinders 12.

The valve device 18 comprises a housing which is composed of a valve body 24 and a tubular member 25 which is supported by the valve body 24. The valve body 24 is formed with a stepped bore which is closed at one end and open at the other. The inner, closed end portion 26 of the stepped bore has a smaller diameter D1 that does an intermediate portion 27 of the stepped bore, the inner and intermediate bore portions 26 and 27 being joined by a flat shoulder 28. The diameter D2 of the intermediate bore portion 27 is smaller than is that of an outer bore portion which is tapped to receive the tubular member 25 which has a stepped bore which is coaxial with the stepped bore of the valve body 24. The inner end 29 of the stepped bore of the tubular member 25 has a diameter D3 which is smaller than the diameter D2 of the intermediate bore portion 27. The relation between the diameters D1 and D3 depends on the desired characteristics of the valve device 18 as is described below. The outer end of the stepped bore of the tubular member 25 forms a cup-shaped recess.

A plunger assembly 31, which is slidable in the coaxial bore portions 26, 27 and 29 comprises an interconnected pair of plunger components. The first plunger component includes one portion 32 which is slidable in the inner end bore portion 26 and which includes two axially spaced lands, each land carrying a packing ring which engages the wall of that bore portion 26, and a larger diameter portion 33 which has a single land which carries a packing ring which engages the wall of the intermediate bore portion 27 which is the central of the three bore portions 26, 27 and 29 in which the plunger assembly 31 is slidable. The second component of the plunger assembly 31 has a single land which carries a packing ring which engages the wall of the inner end portion 29 of the stepped bore in the tubular member 25. The second plunger component is formed with a circumferential groove 34 into which fits an internal rib 35 on a semi-circular wall 36 which projects axially from the first plunger component. The two components of the plunger assembly are thus coupled together from axial movement as one, but are free for slight relative movement transverse to the axis of the stepped bore.

The constantly open passage 22 comprises a diametral passage through the valve body 24 which intercepts the stepped bore of the body 24 adjacent its closed end. The inlet 19 comprises a port which leads into the largest diameter bore portion adjacent the inner end of the tubular member 25, and the outlet 20 comprises a port which leads into the intermediate diameter bore portion 27 adjacent the flat shoulder 28.

An axial bore 37 in the larger diameter portion 33 of the first plunger component extends from the end of that component which is coupled to the second plunger component to a diametral bore 38 which opens into the interior of the stepped bore in the valve body 24 in the region of the flat shoulder 28. The axial bore 37 is stepped to provide a seat 39 for a valve ball 41 which is urged onto that seat 39 by a spring 42 which is housed in a cavity 43 which is formed in the adjacent end of the second plunger component. The valve ball 41 permits flow of liquid from the master cylinder chamber 16 to the motor cylinders 13 of the rear brake operating sub-system only when it is held unseated by a pin 44 of non-circular cross-section which is located in the smaller diameter portion of the axial passage 37, the end of the pin 44 remote from the ball 41 being in abutment with a bar 45 which extends through the diametral bore 38 so that its ends co-operate with the flat shoulder 28 that is formed between the smallest and intermediate diameter portions 26 and 27 of the stepped bore in the valve body 24.

The second plunger component has an outer end portion 47 of reduced diameter which is spigotted into a washer 48. A coiled compression spring 46 holds the washer 48 seated upon the annular shoulder that is formed between the outer end plunger portion 47 and the single land of that plunger component, and reacts against a spring retainer which is a pressed metal can 49, that is of stepped configuration and which is fixed to the tubular member 25. Hence the compression spring 46 urges the plunger assembly 31 towards the closed end of the stepped bore in the valve body 24 so as to hold a reduced diameter projection 40 on the inner end of the first plunger component in contact with the closed end of that stepped bore. With the plunger assembly 31 in this position, the bar 45 that extends through the diametral bore 38 in the first plunger component is seated at its ends on the shoulder 28 in the stepped bore in the valve body 24, and the valve ball 41 is held off its seat 39 by the pin 44 in the axial bore 37 in the first plunger component.

The areas of the plunger portions 26, 27 and 29 having the diameters D1, D2 and D3 respectively are hereinafter referred to as A1, A2 and A3 respectively, such areas of course being proportional to the respective diameters.

Assuming that both sub-systems of the liquid pressure braking system are operative and the pressure (P1) in the rear brake operating sub-system is below that at which the valve device 18 is designed to operate, the action of the biassing spring 26 upon the plunger assembly 31 is opposed by the action upon an area (A2 - A1) of the piston assembly 31 of the pressure that is developed in the master cylinder chamber 16, that is the pressure in the rear brake operating sub-system, and which acts in the end of the central bore portion 27 that is nearer to the closed end of the stepped bore in the valve body 24, together with the action upon the area A1 of the plunger assembly 31 of the pressure (P2) that is developed in the other master cylinder chamber 17, that is the pressure that acts in the front brake operating sub-system. The pressure that is developed within the master cylinder chamber 16, that is the pressure in the rear brake operating sub-system, also acts within that part of the central bore portion 27 between the first plunger component and the tubular member 25 and thus acts upon an area (A2 - A3) of the plunger assembly 31 in the same direction as does the biassing spring 46. Hence the resultant liquid pressure loading on the plunger assembly 31 that acts in opposition to the loading of the biassing spring 46 is P1(A3 - A1)+P2(A1) since the opposing pressures on the area A2 cancel out.

This resultant thrust increases with increase in the pressure P1 and eventually overcomes the loading of the biassing spring 46. The thrust that opposes the action of the biassing spring 46 is now provided by the pressure P3 in the rear brake motor cylinders 13 that acts in the end of the central bore portion 27 nearer to the closed end of the stepped bore in the valve body 24 and by the pressure P2 in the front brake sub-system, and the thrust that assists the biassing spring 46 is provided by the action of the pressure P1 of the rear brake sub-system in that part of the central bore portion 27 between the first plunger component and the tubular member 25 so that the resultant thrust that opposes the action of the biassing spring 46 is P3(A2 - A1)+P1(A1)-P2(A2 - A3).

Clearly, if the sub-system operating the front brakes becomes inoperative, the component P1(A1) of the thrust that opposes the action of the biassing spring 46 is zero and a higher pressure in the rear brake operating sub-system is required to operate the valve device 18 and maintain the pressure that acts in the motor cylinders 13 to operate the brakes in the rear wheels 11 at a pressure which is lower than the pressure that is developed in the respective master cylinder chamber 16.

The above description of the operation assumes that the area A3 is greater than the area A1. The thrust that opposes the action of the biassing spring 46 when the valve ball 41 is unseated and the front brake operating system fails will be equal to or less than the thrust that assists the action of the biassing spring 46, so that the ball 41 will remain unseated and the pressure that acts in the motor cylinders 13 to operate the rear brakes will remain equal to that developed in the respective master cylinder chamber 16, if the area A3 is equal to or less than the area A1.

In the embodiment of this invention that is described above with reference to FIG. 1, the stepped bore in the valve body 24 and the inner end bore 29 of the tubular member 25 together provide a bore to receive the plunger assembly 31 which has a relatively larger diameter central bore portion 27 between two smaller diameter end bore portions 26 and 29. Other arrangements of the valve body to povide such a bore for the plunger assembly 31 may be provided. One such arrangement has the portion of the valve body in which the larger diameter central bore portion is formed extended to receive the spring retainer, a sleeve being held in position in the valve body by a clip ring to provide the other smaller diameter portion of the bore.

FIG. 2 shows a valve device 58A which is a modified form of the valve device 18. The following description of the valve device 58A will be limited to those features of the valve device 58A that differ from the corresponding features of the valve device 18. The valve device 58A differs from the valve device 18 in that the coil spring 46 and the spring retainer can 49 are omitted. The reduced diameter outer stem portion 75A of the plunger assembly 71A of the valve device 58A extends through the central aperture of an annular boot 97 of flexible material. The valve body 64A of the valve device 58A is mounted on the body 98 of the vehicle so that the reduced diameter outer stem portion 75A of the plunger assembly 71A projects towards a lever 99 which is mounted pivotally upon the valve body 64A. A coil spring 101 has one end coupled with a component 102 of the vehicle suspension system which moves with up and down movement of the rear wheels 51 of the vehicle relative to the vehicle body 98 and the other end coupled to an end portion of the lever 99 which is spaced from the lever fulcrum.

The valve device 58A has inlets 59A and 61A and outlets 60A and 63A which are similar to those of the valve device 18 and by which it is connected in a similar manner into a liquid pressure braking system which is similar to that which has been described above with reference to FIG. 1. The plunger assembly 71A of the valve device 58A is urged towards the lever 99 by the differential liquid pressure loading that acts upon it when the tandem master cylinder 14 is operated to apply the brakes, so that the reduced diameter outer stem portion 75A of the plunger 71 abuts a point on the lever 99 between the lever fulcrum and the end of the lever 99 to which the coil spring 101 is coupled. Hence the coil spring 101 acts through the lever 99 to exert a biassing load upon the plunger 71A which varies with the loading of the vehicle and which acts to oppose the differential liquid pressure loading upon the plunger assembly 71A.

FIG. 3 illustrates a valve device 18A which is another modified form of the valve device 18 that has been described above with reference to FIG. 1 and which, like the valve device 58A, has been designed for use with an external spring system, like the coil spring 101 and the lever 99, which functions as biassing means that exert a load upon the plunger assembly 31A of the valve device 18A which varies with the loading of the vehicle. The following description of the valve device 18A will be limited to those features of the valve device 18A that differ from the corresponding features of the valve device 18. Features of the valve device 18A that are similar to corresponding parts of the valve device 18 and which are referred to in the following description of the valve device 18A will be identified by the numeral reference by which the corresponding parts of the valve device 18 are identified above and to which the suffix A is added.

Like the valve device 58A, the valve device 18A comprises a main valve body 24A in which a stepped bore is formed, the stepped bore being closed at one end and open at the other. The first plunger component has its smaller diameter land 32A engaged slidably within the inner end bore portion 26A and its larger diameter land 33A engaged slidably in that one 27A of two intermediate diameter portions of the stepped bore that has the smaller diameter and is adjacent the closed end bore portion 26A. The second plunger portion has its land engaged slidably within the bore 103 of a sleeve 104 which has a stepped cylindrical outer surface. Each portion of the outer surface of the sleeve 104 is spigotted into a respective one of the outer end portion and the other of the two intermediate diameter portions of the stepped bore. The sleeve 104 is retained in position with its shoulder in abutment with the shoulder that is formed between the two bore portions into which it is spigotted by a clip ring 105 which is engaged within a circumferential groove in the cylindrical surface of the outer end bore portion. The outer end bore portion is rebatted at the mouth of the stepped bore to provide an annular recess which receives the peripheral portion of an annular boot 106 of flexible material. The inner peripheral portion of the annular boot 106 is received within a circumferential groove 107 which is formed adjacent the outer end of the outer end plunger portion 47A which projects axially from the land of the second plunger component outwardly through the mouth of the stepped bore.

An annular component, which is a metal pressing, is located within the annular space that is in direct communication with the outlet 20A and that is formed within the intermediate diameter bore portion 27A between the flat shoulder 28A and the larger diameter land 33A of the first plunger component. The annular component comprises a flat annular disc portion 109 which abuts the flat shoulder 28A and which is located radially by the interengagement of its radially outer peripheral edge with the cylindrical wall of the intermediate diameter bore portion 27A, and a cylindrical rim portion 110 which projects axially from the disc portion 109 and which has its outer cylindrical surface spaced radially from the cylindrical wall of the intermediate diameter bore portion 27A and its inner cylindrical surface spaced radially outwardly from the inner peripheral edge of the annular disc portion 109 through which the smaller diameter land 32A of the first plunger portion projects. The bar 45A projects outwardly from the diametral bore 38A in the first plunger component and has each of its ends in contact with the inner cylindrical surface of the cylindrical rim portion 110. Hence the bar 45A is guided for movement with the plunger assembly 31A by the cylindrical rim portion 110.

The stepped axial bore 37A has an outer end portion which has a diameter that is larger than the diameter of the two bore portions that co-operate together to provide the valve seat 39A. Radial passages 111 in the first plunger component place that part of the stepped axial bore 37A that is upstream of the valve seat 39A in direct communication with that part of the stepped bore that is formed in the valve body 24A between the sleeve 104 and the larger diameter land 33A of the first plunger component and that is in direct communication with the inlet 19A. The inner end 112 of the second plunger component is received within the outer end portion of the stepped axial bore and is pinned to the first plunger component by a transverse roll pin 113 which projects radially from both sides of it and which has each of its ends spigotted into a respective one of an opposed pair of radial bores in the first plunger component. The coil spring that urges the ball 41A to seat upon its seat 39A reacts against the end surface of the inner end 112 of the second plunger component.

Operation of the valve device 18A will be apparent from the foregoing description with reference to FIG. 1 of the operation of the valve device 18.

Manufacture of a valve device which embodies this invention is simpler than the manufacture of other forms of valve device that have been proposed previously for a similar use at least partly because the stepped cavity can be formed in the main valve body on a single forming machine without the need for it to be necessary to set the main valve body in position upon the worktable of that machine more than once.

I claim:

1. A valve device for use in a liquid pressure vehicle braking system which has two sub-systems, comprising a housing having a stepped cavity closed at one end and opened at the other end, biasing means, a stepped plunger mounted within said cavity and arranged when the valve device is mounted in a braking system so that liquid pressure in said braking system exerts a force on the stepped plunger which is opposed by said biasing means, a passage in said housing, a valve member, said biasing means engaging said plunger and tending to move same to permit said valve member to open said passage to bypass said plunger, said cavity having a central portion of uniform cross-section between two end portions, each end portion of the cavity having a uniform cross-section and being smaller in cross-sectional area than in the central portion of the cavity, the stepped plunger comprises a plunger assembly located within said cavity and having three lands, a central one of the three lands being slidably fitted within the central cavity portion and each of the other two lands being slidably fitted within a respective one of the two end cavity portions, said housing having a first port which opens into the closed end portion of the cavity and which is for connection into the first of the two sub-systems when the valve device is mounted in a braking system, second and third ports in said housing opening into the central cavity portion with one on each side of the central plunger land and being for connection into the second of the two sub-systems when the valve device is mounted in a braking system, the by-pass passage being formed in said plunger assembly and connecting the part of the central cavity portion that is on one side of the central plunger land to the part of the central cavity portion that is on the opposite side of the central plunger land, the said valve member being a one-way valve in said passage, and abutment means in said housing co-operating with a stop surface provided in said cavity to hold said one-way valve open for certain positions of the plunger assembly within the cavity, the end of the plunger assembly remote from the closed end of the cavity being adapted to be acted upon by said biasing means when the valve device is mounted in a liquid pressure vehicle braking system so that the biasing means urges the plunger assembly towards the closed end of the cavity and the abutment means being so arranged that the one-way valve is opened as the plunger assembly approaches the end of the cavity, said plunger assembly comprising two components which are coupled together, the central land and one of the other two lands being formed as one of the plunger components and the other land being formed as the other plunger component, said two plunger components being coupled together for longitudinal movement but being free for limited movement one relative to the other transverse to the cavity, said first of said two plunger components being formed with a semi-circular wall which projects axially from it and upon which is formed an internal rib which fits into a circumferential groove that is formed in the second plunger component.

2. A valve device for use in a liquid pressure vehicle braking system which has two sub-systems, comprising a housing having a stepped cavity closed at one end and opened at the other end, biasing means, a stepped plunger mounted within said cavity and arranged when the valve device is mounted in a braking system so that liquid pressure in said braking system exerts a force on the stepped plunger which is opposed by said biasing means, a passage in said housing, a valve member, said biasing means engaging said plunger and tending to move same to permit said valve member to open said passage to bypass said plunger, said cavity having a central portion of uniform cross-section between two end portions, each end portion of the cavity having a uniform cross-section and being smaller in cross-sectional area than is the central portion of the cavity, the stepped plunger comprises a plunger assembly located within said cavity and having three lands, a central one of the three lands being slidably fitted within the central cavity portion and each of the other two lands being slidably fitted within a respective one of the two end cavity portions, said housing having a first port which opens into the closed end portion of the cavity and which is for connection into a first of the two sub-systems when the valve device is mounted in a braking system, second and third ports in said housing opening into the central cavity portion with one on each side of the central plunger land and being for connection into the second of the two sub-systems when the valve device is mounted in a braking system, the by-pass passage being formed in said plunger assembly and connecting the part of the central cavity portion that is on one side of the central plunger land to the part of the central cavity portion that is on the opposite side of the central plunger land, the said valve member being a one-way valve in said passage, and abutment means in said housing co-operating with a stop surface provided in said cavity to hold said one-way valve open for certain positions of the plunger assembly within the cavity, the end of the plunger assembly remote from the closed end of the cavity being adapted to be acted upon by said biasing means when the valve device is mounted in a liquid pressure vehicle braking system so that the biasing means urges the plunger assembly towards the closed end of the cavity and the abutment means being so arranged that the one-way valve is opened as the plunger assembly approaches that end of the cavity, said plunger assembly comprising two plunger components which are coupled together, the central land and one of the other two lands being formed as one of the plunger components and the other land being formed as the other plunger component, said two plunger components being interconnected by a transverse pin.

3. A valve device for use in a liquid pressure vehicle braking system which has two sub-systems, comprising a housing having a stepped cavity closed at one end and opened at the other end, biasing means, a stepped plunger mounted within said cavity and arranged when the valve device is mounted in a braking system so that liquid pressure in said braking system exerts a force on the stepped plunger which is opposed by said biasing means, a passage in said housing, a valve member, said biasing means engaging said plunger and tending to move same to permit said valve member to open said passage to bypass said plunger, said cavity having a central portion of uniform cross-section between two end portions, each end portion of the cavity having a uniform cross-section and being smaller in cross-sectional area than is the central portion of the cavity, the stepped plunger comprises a plunger assembly located within said cavity and having three lands, a central one of the three lands being slidably fitted within the central cavity portion and each of the other two lands being slidably fitted within a respective one of the two end cavity portions, said housing having a first port which opens into the closed end portion of the cavity and which is for connection into a first of the two sub-systems when the valve device is mounted in a braking system, second and third ports in said housing opening into the central cavity portion with one on each side of the central plunger land and being for connection into the second of the two sub-systems when the valve device is mounted in a braking system, the by-pass passage being formed in said plunger assembly and connecting the part of the central cavity portion that is on one side of the central plunger land to the part of the central cavity portion that is on the opposite side of the central plunger land, the said valve member being a one-way valve in said passage, and abutment means in said housing co-operating with a stop surface provided in said cavity to hold said one-way valve open for certain positions of the plunger assembly within the cavity, the end of the plunger assembly remote from the closed end of the cavity being adapted to be acted upon by said biasing means when the valve device is mounted in a liquid pressure vehicle braking system so that the biasing means urges the plunger assembly towards the closed end of the cavity and the abutment means being so arranged that the one-way valve is opened as the plunger assembly approaches that end of the cavity, said by-pass passage extending axially within said plunger assembly and being stepped to provide a shoulder intermediate its ends, the shoulder serving as a seat for the one-way valve closure member, there being a spring which acts to seat the one-way valve closure member and which reacts against an abutment surface that is formed on part of the piston assembly, said abutment means that co-operate with a stop surface in said cavity to hold said one-way valve open comprising a valve unseating pin within the smaller diameter portion of the passage, and said stop surface comprising a shoulder in the cavity, wherein the abutment means includes a bar that projects laterally from the plunger assembly and which co-operates with both the valve unseating pin and the shoulder that is formed between the closed end cavity portion and the central cavity portion.

4. A valve device according to claim 3, wherein the plunger assembly comprises two plunger components which are coupled together, the central land and the land that slides within the closed end portion of the cavity being formed on one of the plunger components, the land that slides within the other end cavity portion being formed on the other plunger component and the abutment surface being formed on said other plunger component.

* * * * *